W. V. TURNER.
ELECTROFLUID PRESSURE BRAKE.
APPLICATION FILED SEPT. 27, 1917.
1,297,514.
Patented Mar. 18, 1919.
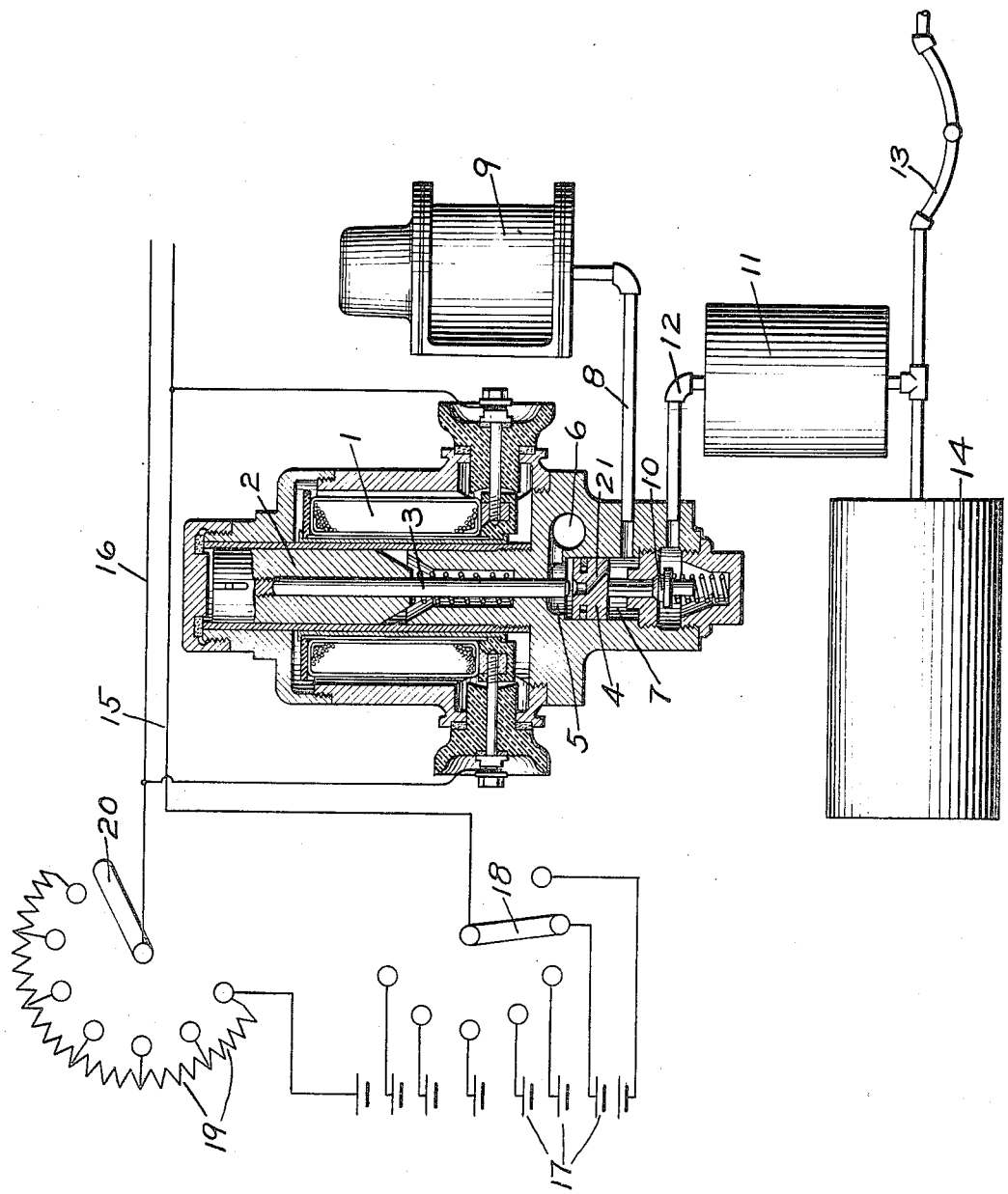
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROFLUID-PRESSURE BRAKE.

1,297,514. Specification of Letters Patent. Patented Mar. 18, 1919.

Application filed September 27, 1917. Serial No. 193,595.

*To all whom it may concern:*

Be it known that I, WALTER V. TURNER, a citizen of the United States, residing at Wilkinsburg, in the county of Allegheny and State of Pennsylvania, have invented new and useful Improvements in Electro-fluid-Pressure Brakes, of which the following is a specification.

This invention relates to electro-pneumatic brakes as employed for stopping railway trains.

The principal object of my invention is to provide an improved electro-pneumatic brake of the type in which the braking power is adapted to be varied by increasing or diminishing the electric current flow to the brake controlling magnets.

In the accompanying drawing, the single figure is a diagrammatic view, partly in section, of an electro-pneumatic brake equipment embodying my invention.

As shown in the drawing, the apparatus may comprise a magnet 1 on each car of the train, having an armature 2, carrying a stem 3 provided with a valve at one end for engaging a valve seat in a piston 4.

The chamber 5 at one side of the piston 4 is open to an exhaust port 6 and chamber 7 at the opposite side is connected by pipe 8 to brake cylinder 9. The piston 4 is adapted to operate a valve 10 for controlling the supply of fluid from an auxiliary reservoir 11 through pipe 12 to the brake cylinder 9, the auxiliary reservoir being charged from a train line supply pipe 13 which may be connected to main reservoir 14.

Each magnet 1 is connected in parallel across the train wires 15 and 16 and on the head car there is provided a number of battery units 17, one or more of which can be connected into the magnet circuit by the movement of a switch arm 18.

There is also provided a series of resistance coils 19, having a switch arm 20 for connecting one or more resistance coils into the circuit.

In operation, the switch arm 18 is set to cut in a certain number of battery units 17, to give the voltage desired for a given length of train and then if it is desired to effect an application of the brakes the switch arm 20 is turned so as to cut in more or less of the resistance coils 19 according to the degree of braking power desired.

The energization of the magnet 1 on each car then operates the armature 2 and valve stem 3, so that the valve on the end of the stem seats on the valve seat in the piston 4 and thereby closes the exhaust from the brake cylinder through passage 21 to the exhaust port 6. Further movement of the valve stem 3 then shifts the piston 4, causing same to open valve 10, so that fluid is supplied from the auxiliary reservoir 11 to the brake cylinder 9.

When the brake cylinder pressure, acting in chamber 7 on piston 4, slightly exceeds the force exerted by the armature 2 in the opposite direction, the piston moves so as to permit the valve 10 to seat.

If it is desired to increase the braking force, the switch arm 20 may be turned to cut out more resistance coils 19 and in this way the current strength is increased, and the magnet 1 being thus more strongly energized, the valve 10 is again opened to admit a further supply of fluid to the brake cylinder.

If leakage from the brake cylinder should occur, the reduced brake cylinder pressure acting on piston 4 permits the force of the magnet to again open the valve 10, so that the brake cylinder pressure is always maintained at a predetermined degree, according to the amount of current allowed to flow to the magnet.

By controlling the magnets in parallel across the train line wires, there will be a progressive drop in voltage from the front to the rear of the train which is desirable in that a slightly higher brake cylinder pressure will be obtained at the front end of the train, so that the slack of the train will be bunched and possibility of the train breaking in two prevented, as might happen where the slack is not bunched and the braking power should be greater at the rear than at the head of the train which might occur, for example, in case there are loaded cars at the head end and light cars at the rear end of the train.

Another advantage of connecting the magnets in parallel instead of in series, is that the failure of one local magnet circuit will not prevent the operation of the other magnets throughout the train.

Having now described my invention, what I claim as new and desire to secure by Letters Patent, is:—

1. In an electro-pneumatic brake, the combination with a brake cylinder, of a magnet, means operated according to the opposing forces of the magnet and brake cylinder pressure for supplying fluid to the brake cylinder, battery units, a switch for connecting one or more battery units in circuit with said magnet, resistance units, and a switch for connecting one or more resistance units in circuit with said magnet.

2. In an electro-pneumatic brake, the combination with a brake cylinder, of a magnet, means operated according to the opposing forces of the magnet and brake cylinder pressure for supplying fluid to the brake cylinder, a train line circuit to which said magnet is connected in parallel, battery units, resistance units, and manually operated switches for connecting one or more battery and resistance units into the train line circuit.

In testimony whereof I have hereunto set my hand.

WALTER V. TURNER.